(12) United States Patent
Berthoud

(10) Patent No.: US 10,113,905 B2
(45) Date of Patent: Oct. 30, 2018

(54) RANDOM LIGHT COLLECTOR DEVICE

(71) Applicant: ADVA Optical Networking SE, Meiningen (DE)

(72) Inventor: Patrick Berthoud, Preles (CH)

(73) Assignee: ADVA Optical Networking SE, Meiningen (DE)

( * ) Notice: Subject to any disclaimer, the term of this patent is extended or adjusted under 35 U.S.C. 154(b) by 188 days.

(21) Appl. No.: 15/371,947

(22) Filed: Dec. 7, 2016

(65) Prior Publication Data
US 2017/0167913 A1     Jun. 15, 2017

(30) Foreign Application Priority Data
Dec. 15, 2015  (EP) ..................... 15200263

(51) Int. Cl.
| | | |
|---|---|---|
| *G01J 1/04* | (2006.01) | |
| *G01J 1/42* | (2006.01) | |
| *G04F 5/00* | (2006.01) | |
| *G01J 1/44* | (2006.01) | |
| *H01S 3/13* | (2006.01) | |

(52) U.S. Cl.
CPC .......... *G01J 1/0422* (2013.01); *G01J 1/0455* (2013.01); *G01J 1/4257* (2013.01); *G04F 5/00* (2013.01); *G01J 2001/446* (2013.01); *H01S 3/13* (2013.01); *H01S 2301/02* (2013.01)

(58) Field of Classification Search
CPC ...... G01J 1/0422; G01J 1/4257; G01J 1/0455; G01J 2001/446; G04F 5/00; H01S 2301/02; H01S 3/13
USPC ....................................... 250/227.11, 227.31
See application file for complete search history.

(56) References Cited

U.S. PATENT DOCUMENTS

| | | | | |
|---|---|---|---|---|
| 4,321,630 A | * | 3/1982 | Kramer .................. | H04N 1/401 250/228 |
| 5,650,843 A | * | 7/1997 | Moberg ............. | H04N 1/02815 250/205 |
| 6,566,667 B1 | | 5/2003 | Partlo et al. | |
| 2009/0302957 A1 | | 12/2009 | Levi et al. | |

(Continued)

FOREIGN PATENT DOCUMENTS

| | | |
|---|---|---|
| EP | 2131500 A2 | 12/2009 |
| WO | 2006077437 A1 | 7/2006 |

OTHER PUBLICATIONS

Bondo et al. "Time-resolved and state-selective detection of single freely falling atoms", Optics Communications, 2006, pp. 271-277, vol. 264.

(Continued)

*Primary Examiner* — Seung C Sohn
(74) *Attorney, Agent, or Firm* — The Webb Law Firm

(57) ABSTRACT

Disclosed is a random light collector device including a reflecting cavity configured to enclose a random light source that randomly transmits photons. The reflecting cavity has an inner wall adapted to reflect at least a portion of the photons to an output port and guiding means for directing the photons to a photodetector. The guiding means is a hollow tube having an inner wall adapted to reflect the photons, wherein a first end of the hollow tube is connected to or positioned adjacent to the output port of the reflecting cavity and wherein the photodetector is provided within the hollow tube or at a second end such that a sensitive area of the photodetector covers the cross-section of the second end.

20 Claims, 2 Drawing Sheets

(56) References Cited

U.S. PATENT DOCUMENTS

2011/0097045 A1    4/2011   Benabid
2013/0194046 A1    8/2013   Schober et al.

OTHER PUBLICATIONS

Westphal et al. "Compact and freely moveable single atom detector", Review of Scientific Instruments, 1999, pp. 1326-1332, vol. 70:2.

* cited by examiner

RANDOM LIGHT COLLECTOR DEVICE

CROSS-REFERENCE TO RELATED APPLICATION

This application claims priority to European Patent Application No. 15 200 263.0 filed Dec. 15, 2015, the disclosure of which is hereby incorporated in its entirety by reference.

BACKGROUND OF THE INVENTION

Field of the Invention

The invention relates to a random light collector device.

Description of Related Art

Physical systems dealing with random light emission sources in general use a vapor or beam of atoms or molecules generated in a vacuum, wherein at a desired position along the beam the atoms or molecules included in a small axial section of the beam are excited by a pump laser beam which intersects the beam of atoms or molecules, for example at a right angle. The laser beam has a precisely defined wavelength suitable to cause a specific fluorescence due to the excitation of the atoms or molecules from a specific ground state to a specific excited state. The fluorescent light is detected and the wavelength of the pumping laser may be adjusted in such a way that the detection signal, which is proportional to the optical power of the fluorescent light, is maximized or minimized depending on the specific application.

Physical systems using such random light emission sources are, for example, frequency standards for GPS satellites. Especially cesium beam frequency standards have met and exceeded the stability requirements necessary to achieve the timing and position accuracy of GPS systems. Also beams of any other alkali metal atoms like rubidium atoms may be used to realize frequency standards.

One of the major problems for realizing such frequency standards is the detection of the fluorescent light with a suitably high efficiency. The light source realized by the pumping beam which intersects the beam of atoms or molecules (in the following, the term "atoms" is used as a general term for atoms and molecules) can be considered as point source imaging non-directive light, i.e. the randomly emitted photons cover a $4\pi$ steradian solid angle. As the power of the fluorescent light is very low—a few photons per atom are emitted only while the atom crosses the pumping zone—the light collection efficiency has to be maximized. That is, as much photons as possible must be detected which means that every photon should be detected independently of the solid angle into which it is emitted.

One solution is to position the photodetector as closely as possible to the atom emitting source. However, this is in many cases technically impossible, especially as many photodetectors having desired properties (especially a large sensitive area and a low signal-to-noise ratio) cannot be used in a vacuum environment. Further, the creation of the atom beam and the pumping zone must be shielded against disturbing magnetic fields, which does not allow to position ferromagnetic elements or materials within this shielded zone.

By positioning the photodetector away from the emission source, the detection efficiency significantly decreases due to the reduced solid angle covered by the photodetector. Using a larger photodetector or an array of photodetectors is not an appropriate partial solution to this problem as this would lead to an increase in its noise contribution and thus limit its signal-to-noise ratio to an unacceptable level.

In order to improve the fluorescent light detection efficiency while remaining compatible with technical requirements, a closed mirror assembly with means for guiding light is known, for example from T. Bondo et al., "Time-resolved and state-selective detection of single freefalling atoms", Mar. 9, 2006 (downloadable from: http://www.researchgate.net/publication/224045239_Time-resolved_and_state-selective_detection_of_single_freely_falling_atoms). This closed mirror assembly comprises an ellipsoid concave mirror and a spherical concave mirror. The random light source is provided in the first focal point of the ellipsoid mirror (the focal point closer to the respective mirror surface) and the second focal point of the ellipsoid mirror is essentially positioned on the surface of the spherical mirror. The focal point of the spherical mirror coincides with the first focal point of the ellipsoid mirror. The spherical mirror has a circular opening of a given diameter located at the second focal point of the ellipsoid mirror, i.e. in the intersection of the spherical mirror and the optical axis formed by the two focal points of the ellipsoid mirror. The random light source is realized by a beam of slowly moving rubidium atoms which is intersected by a pumping laser beam at the first focal point of the ellipsoid mirror. A telescope consisting of several lenses, an aperture and a filter is used to focus the fluorescent light onto the sensitive area of a photodetector. Due to the configuration of the telescope, the image of the fluorescent light in the plane of the output port is reproduced on the sensitive area of the photodetector, practically without major distortions.

This random light collector device reveals the disadvantage that, in addition to the transparent window of the vacuum chamber, each of the three lenses and the additional optical band pass filter of the telescope attenuate the light to be detected. Further, the lenses must be positioned radially with respect to the optical axis and axially with respect to each other and the photodetector, respectively.

It is thus an object of the present invention to provide a random light collector device, especially for realizing a frequency standard, which reveals an improved collection efficiency, which has a simpler design resulting in lower manufacturing costs.

SUMMARY OF THE INVENTION

The invention uses a simple hollow tube for guiding the fluorescent light that is focused in the circular opening of the spherical mirror to the photodetector. The hollow tube has an inner wall or surface adapted to reflect the light, i.e. the single photons, with a sufficiently low loss. A first end of the hollow tube is connected with or merely positioned adjacent to the output port of the reflecting cavity. The photodetector is provided within the hollow tube or at a second end thereof in such a way that a sensitive area of the photodetector covers the whole cross-section of the second end.

In this way, the photons that reach the output port of the reflecting cavity are guided to the sensitive area of the photodetector. The only optical attenuation is caused by a window of a vacuum enclosure and the non-ideal reflectivity of the inner surface of the hollow tube. The hollow tube may even be bent, the bend revealing an admissibly large bending radius and an admissibly low wrap angle.

According to an embodiment of the present invention, the hollow tube may be tightly connected to the cavity, preferably by screwing, bonding, welding or brazing. This improves the stability of the random light collector device and the stability of the position of the hollow cube with respect to the reflecting cavity.

According to a preferred embodiment of the invention, the cross-section of the hollow tube is, at least at the first end thereof, equal to or greater than the three-dimensional extension of the random light source, especially equal to or greater than the cross-section of the three-dimensional extension of the random light source in a plane orthogonal to the straight line between the center of the random light source and the center of the cross section of the hollow tube at the first end thereof. In this way, even for non-ideal point sources a sufficiently high collection efficiency can be achieved.

According to the invention, the hollow tube may have a straight axis that is aligned with the straight line through the center of the random light source and the center of the cross-section of the hollow tube at the first end thereof. Such straight hollow tubes are easy to manufacture with respect to the reflecting inner surface and reveal a minimum attenuation compared with bent hollow tubes.

As known in the prior art, the random light collector device according to the invention may comprise a reflecting cavity that consists of an ellipsoid concave mirror having a reflecting inner surface and a first focal point (F1) and a second focal point (F2) and of a spherical concave mirror having a reflecting inner surface and a third focal point (F3). The ellipsoid concave mirror and the spherical concave mirror preferably have a common optical axis, wherein the first focal point essentially coincides with the center of the random light source, wherein the second focal point essentially coincides with the center of the cross-section of the output port or the surface of the spherical concave mirror, respectively, and wherein the third focal point coincides with the first focal point. This optical reflector cavity design leads to a high collection efficiency.

According to the invention, the ellipsoid concave mirror and the spherical concave mirror are connected or positioned adjacent to each other in a plane perpendicular to the common optical axis, wherein the radii of the reflecting inner surfaces of the ellipsoid concave mirror and the spherical concave mirror are identical in this plane. In other words, the cross-section of the reflecting inner surface of the reflecting cavity is, in all planes parallel to the optical axis, a continuous curve (of course apart from the openings or windows required for supplying and extracting the atom beam and the pumping beam, respectively).

This feature further improves the efficiency of the random light collector device as there is no step in the inner wall of the closed cavity disturbing the desired reflection properties, contrary to the device according to T. Bondo et al. (see above) in which there is a step. Of course, this feature of using a closed cavity without any step in its inner wall may be used to improve the efficiency of a random light collector device independently of the design of the guiding means for directing the reflected photons and photons which are directly emitted to the output port of the photodetector.

In a further embodiment, the random light collector comprises an essentially closed magnetic shield encompassing the reflecting cavity, wherein the hollow tube extends through the magnetic shield. In this way, any magnetic field is prevented from disturbing the random light source and other elements sensitive to magnetic fields.

As the hollow tube may extend into the inner space within the magnetic shield, the hollow tube is preferably made of a non-ferromagnetic material, e.g. a non-ferromagnetic metal like copper.

Of course, the magnetic shield may be mechanically connected to the outer surface of the hollow tube in order to achieve a robust construction of the random light collector device. But for avoiding any perturbation to the magnetic shield, the hollow tube should be electrically isolated from it.

According to a further embodiment of the present invention, the random light collector comprises a vacuum-tight enclosure encompassing the reflecting cavity. The hollow tube might remain fully under vacuum, provided that a vacuum-tight window is placed sufficiently close to the output of the hollow tube and provided that the photodetector is placed sufficiently close to the vacuum-tight window for minimizing optical power losses. The hollow tube might also extend through the vacuum-tight enclosure provided that the vacuum-tight enclosure is vacuum-tightly connected to the outer surface of the hollow tube. In those ways, the photodetector may be provided at a position outside of the vacuum.

In order to seal the vacuum space within the vacuum enclosure, the cross-section of the hollow tube may be vacuum-tightly closed and sealed by a transparent sealing element, wherein the transparent sealing element is provided within the axial length of the hollow tubing or wherein the transparent sealing element covers the second end of the hollow tube and abuts the end face thereof.

The photodetector may be positioned adjacent to the transparent sealing element outside of a vacuum space defined by the vacuum-tight enclosure and the hollow tube comprising the transparent sealing element.

According to an embodiment of the invention, the reflecting cavity and the hollow tube may be made of pure metal, e.g. of an oxygen-free high thermal conductivity copper.

As the hollow tube allows to extract the fluorescent light from the vacuum enclosure, rather simple and cheap silicon photodiodes, e.g. Si PIN photodiodes, may be used as photodetectors. Such photodiodes are available with large sensitive areas. The hollow tube may, for example, reveal an inner diameter of 0.5 cm to 2 cm, so a photodetector having a correspondingly large sensitive area is required. The length of the hollow tube may, for example, lie within a range from 1 cm to 5 cm in order to reduce the number of reflections for photons at steeper angles and thus the attenuation.

BRIEF DESCRIPTION OF THE DRAWINGS

Further objects and advantages of the present invention will become apparent from the following description of a preferred embodiment that is given by way of example with reference to the accompanying drawings, wherein.

DETAILED DESCRIPTION OF THE INVENTION

Figure 1:
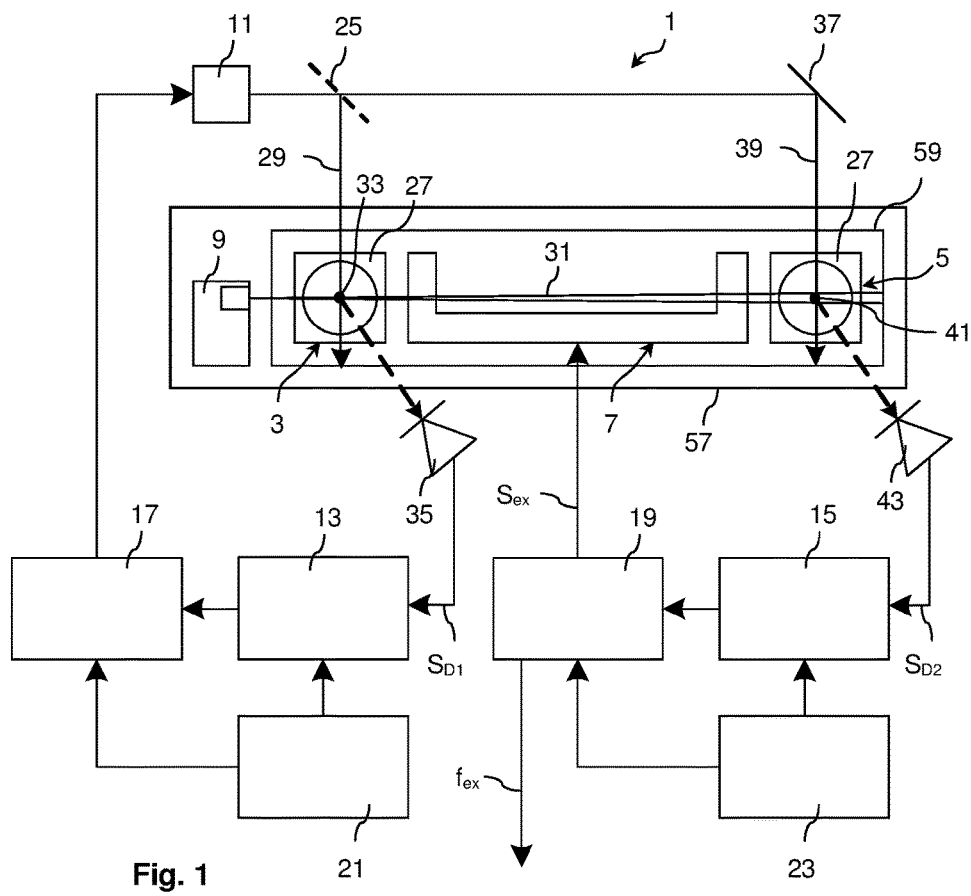
FIG. 1 is a schematic representation of the main components of a frequency standard.

FIG. 1 shows a schematic view of the main components of a frequency standard 1 comprising two random light collector devices 3, 5, a Ramsey cavity 7 and a cesium oven 9 as well as a pump laser 11. Further, the frequency standard comprises an electronic control means consisting of a first and second synchronous detector 13, 15, a laser driver 17, a radio frequency (RF) source 19 and a first and second modulating frequency source 21, 23.

The general function of such a frequency standard is well known and shall merely be briefly described in the following: The laser driver 17 controls the pump laser 11 in such a way that a laser beam having a predetermined controllable wavelength of for example 852 nm is created. The laser beam is partially deflected by a first mirror 25 in such a manner that a deflected beam passes through a closed cavity 27 of the random light collector device 3. Of course, the closed cavity 27 has two apertures through which the pump light produced by the pump laser 11 passes with sufficiently low attenuation. As shown in FIG. 1, the pump light beam 29 that passes through the cavity 27 of the random light collector device 3 intersects, essentially at a right angle, a beam 31 of cesium atoms created by the cesium oven 9 that also passes through the closed cavity 27 essentially along an optical axis of the cavity 27. At the point or within the small three-dimensional area of intersection of the pump light beam 29 and the beam 31 of cesium atoms, a random light source 33 is created due to fluorescent light of a specific optical wavelength or frequency created by optical pumping of the cesium atoms.

The components for generating and exciting the beam 31 of cesium atoms, i.e the cesium oven 9, the two random light collector devices 3, 5 and the Ramsey cavity 7 are provided within a vacuum enclosure 57. Of course, the vacuum enclosure 57 has two transparent windows (not shown in FIG. 1) through which the pump light created by the pump laser 11, i.e. the respective pump light laser beams, pass into the vacuum enclosure 57 and into the closed cavities 27 of the random light collector devices 3, 5.

Further, a magnetic shield assembly 59 is provided, which is made of one or more embedded shields. This assembly encloses the relevant area of the beam 31 of cesium atoms in order to avoid any deteriorating influence due to external magnetic fields, especially any deflection of the cesium atoms and any induced change of the energy levels. Generally, the magnetic shield assembly 59 must be provided within the vacuum enclosure 57 as the cesium oven 9 is necessarily included within the vacuum enclosure 57. The cesium oven 9 usually comprises an electrical heating means which generates a strong magnetic field, the influence of which on to the atom beam 31 must be avoided.

Of course, as apparent from FIG. 1, the random light collector devices 3, 5 are preferably designed in such a way that the fluorescent light created by the respective random light source can be detected outside the vacuum enclosure 57. In this way, rather simple and cheap photodetectors, e.g. Si PIN photodiodes, may be used for detecting the fluorescent light. Such photodiodes are available with large sensitive areas and with reasonable low signal-to-noise ratios.

The creation of the fluorescent light is in greater detail explained with reference to FIG. 2, which shows a simplified energy level diagram of cesium atoms ($^{133}$Cs), wherein the $5P_{3/2}$ excited states are shown along with the $5S_{1/2}$ ground state, only. A similar optical pumping scheme is achievable using the $5P_{1/2}$ excited state with a pumping light wavelength at 895 nm.

The $^{133}$Cs atoms of the beam 31 are fed to the cavity 27 through an opening having a small diameter of a few millimeters, only, along the optical axis of the cavity. Due to the pumping by the pump light beam 29 the atoms being in the $5S_{1/2}$ F=4 ground state are excited to the $5P_{3/2}$ F'=4 excited state if the pump light has the appropriate wavelength of 852 nm. The atoms being already in the $5S_{1/2}$ F=3 ground state remain on this energy level. The exited atoms return to the ground state after a short interval of a few nanoseconds, wherein fluorescent light having a corresponding optical wavelength or frequency is created (one photon per transition). The excited atoms return to any of the ground states $5S_{1/2}$ F=3 or $5S_{1/2}$ F=4. If atoms end up in the $5S_{1/2}$ F=3 ground state, they remain in this state as the laser light is off resonance. If atoms end up in $5S_{1/2}$ F=4 ground state, they may again be excited to the respective excited state. This process is called optical pumping and terminates when all atoms have fallen in the $5S_{1/2}$ F=3 ground state or when the atoms have exited the laser beam intersection. Similar optical pumping processes are possible with the laser wavelength tuned to another atomic optical transition, which can enhanced the population of any of the two ground states. While the atoms cross the zone of a few millimeters (e.g. 1 to 4 mm) of the axial length of the beam 31 which is irradiated by the pump light, up to 4 photons per atom on average are created depending on the chosen optical transition. As a result, the atom beam 31 leaving the closed cavity 27 by another appropriate small diameter opening practically exclusively consists of atoms which are in their $5S_{1/2}$ F=3 ground state if the pump light has the exact appropriate wavelength.

This state of the atom beam in which a maximum of atoms is in the $5S_{1/2}$ F=3 ground state can be achieved by controlling the wavelength of the pump laser 11 in such a way that the power of the fluorescent light created by the random light source 33 is maximized. For this purpose, the random light collector device 3 comprises a photodetector 35 adapted to detect the light power of the single photons of the fluorescent light. The laser driver is amplitude modulated at the frequency $f_{fm}$, which creates a frequency modulation of the laser wavelength and an amplitude modulated detection signal $S_{D1}$ on the photodetector. This modulated signal $S_{D1}$ is demodulated within the synchronous detector 13, which receives a modulation frequency $f_{fm}$ from the modulating frequency source 21. Thus, for detecting the signal $S_{D1}$, the lock-in principle is applied.

Having exited from the closed cavity 27 of the first random light collector device 3, the atom beam 31 enters the Ramsey cavity 7. An electrical excitation signal $S_{ex}$ having a desired frequency of $f_{ex}$=9.192 GHz is applied to the Ramsey cavity 7. The energy $\Delta E_{ex}$=h·$f_{ex}$ frequency corresponds to the energy difference of the energy ground levels $5S_{1/2}$ F=4 and $5S_{1/2}$ F=3, wherein h designates the Planck constant. Thus, the better the frequency of the electrical excitation signal $S_{ex}$ equals $f_{ex}$=9.192 GHz, the more atoms of the beam entering the Ramsey cavity in the $5S_{1/2}$ F=3 will change their energy level to $5S_{1/2}$ F=4 and leave the Ramsey cavity 7 in this latter state.

The random light collector device 5 reveals an identical design and an identical functionality as the random light collector device 3. A remaining portion of the pump laser beam created by the pump laser 11 which passes the semi-transparent mirror 25 is totally reflected by a further mirror 37 and enters the closed cavity 27 of the random light collector device 5 as a pump laser beam 39. The pump laser beam 39 intersects the beam of cesium atoms 31 at an essentially right angle. In this way, a random light source 41 is created at a position located on the optical axis of the closed cavity 27 of the random light collector device 5.

As the laser frequency is precisely tuned to the optical transition from the ground state $5S_{1/2}$ F=4 to the excited state $5P_{3/2}$ F'=4 by the signal $S_{D1}$, atoms exiting the Ramsey cavity in the ground state $5S_{1/2}$ F=4 will generate fluorescence light in the random light collector 5. Thus, the better the frequency of the electrical excitation signal $S_{ex}$ equals $f_{ex}$=9.192 GHz, the higher the number of photons of the fluorescent light is due to the return of the exited atoms into any of the ground states $5S_{1/2}$ F=3 or $5S_{1/2}$ F=4 and thus the higher the average power of the fluorescent light is, which is detected by a further photodetector 43. The RF source 19 is frequency modulated at $f_{fm}$, which creates an amplitude modulated signal $S_{D2}$ at $f_{fm}$ on the photodetector 43. The detection signal $S_{D2}$ is frequency demodulated in the synchronous detector 15 at the modulation frequency $f_{fm}$, which controls the RF source 19 in such a way that the detection signal $S_{D2}$ is maximized. As is the case with the closed-loop control for controlling the wavelength of the pump laser 11, for detecting the signal $S_{D2}$, the lock-in principle is applied. In this way, the frequency of the RF source 19 is stabilized to the value $f_{ex}$=9.192 GHz with an extremely high precision and stability.

As already stated above, one of the problems in realizing the random light collector devices 3, 5 is to design the closed cavity 27 in such a way that as much of the fluorescent light as possible is a guided to the sensitive area of the photodetectors 35, 41. In order to solve this problem, it has already been proposed to use a closed cavity consisting of a spherical mirror and an ellipsoid mirror having a common axis, wherein the first focal point of the ellipsoid mirror coincides with the center of the random light source and the focal point of the spherical mirror and wherein the second focal point coincides with the surface of the spherical mirror. However, the diameters of the spherical and the ellipsoid mirrors in the plane perpendicular to the optical axis in which the edges of the mirrors are in contact of the known cavity were different. The step in the inner wall thus decreases the collection efficiency to a certain extent.

Figure 3:
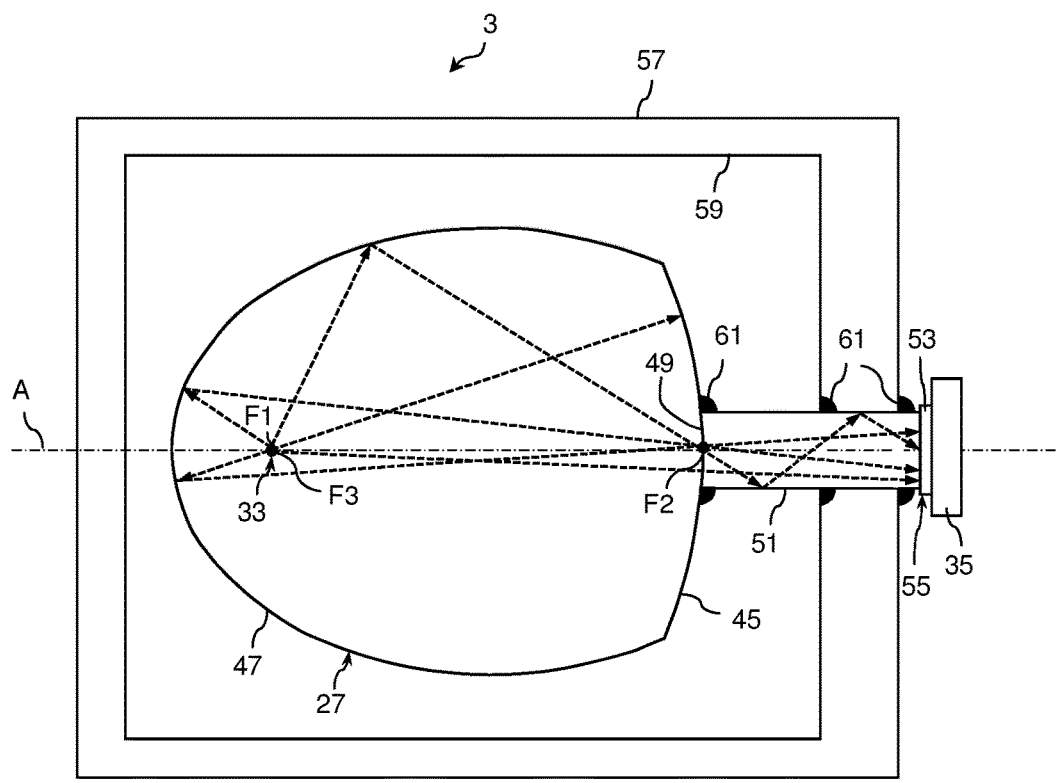
FIG. 3 is a schematic sectional view of an embodiment of a random light collector device according to the invention.

The random light collector device 3 according to FIG. 3 comprises a closed cavity 27 which consists of a spherical mirror 45 and an ellipsoid mirror 47. The mirrors 45 and 47 form a closed cavity the inner reflective wall of which reveals no step in planes intersecting an optical axis A. In other words, the two mirrors 45, 47 are positioned adjacent to each other (of course, the two mirrors may be in contact or fixed to each other) in a plane perpendicular to the optical axis A, wherein the inner reflecting walls of the two mirrors 45, 47 have identical diameters in this plane.

As shown in FIG. 3, the first focal point F1 of the ellipsoid mirror 47 coincides with the focal point F3 of the spherical mirror 45. Further, the random light source 33 is provided in the first focal point F1 of the ellipsoid mirror 47. The second focal point F2 of the ellipsoid mirror 47 coincides with the surface of the spherical mirror 45, i.e. with the point of intersection defined by the optical axis A and the inner reflecting surface of the spherical mirror 45.

Due to this design of the closed cavity 27, photons of the fluorescent light emitted by the random light source in directions in which the photons are reflected by the ellipsoid mirror 47 are focused in the second focal point F2, i.e. at the intersection of the axis A and the surface of the spherical mirror 45. Photons which are emitted in directions in which the photons are reflected by the spherical mirror 45 are focused in the first focal point F1 and thus again reflected by the ellipsoid mirror 47 and focused in the second focal point F2. Therefore, theoretically all photons are focused in the second focal point F2 which leads to a theoretical collection efficiency of 100%. Of course, due to a given three-dimensional extension of the random light source of e.g. a few millimeters (e.g. 1 to 4 mm) the collection efficiency is decreased. Further, additional attenuation is caused due to the non-ideal reflectivity of the reflective inner wall of the two mirrors 45, 47.

Of course, the closed cavity 27 shown in FIG. 3 must also comprise respective windows or openings for allowing the pump light and small openings for allowing the beam 31 of atoms to pass through the cavity 27. To simplify matters, these windows and/or openings are not shown in FIG. 3.

As apparent from FIG. 3, the spherical mirror 45 reveals an opening which is provided coaxially with the optical axis A. This opening defines an output port 49 through which the photons or light beams leave the closed cavity 27 and enter a hollow tube 51. Like the two mirrors 45, 47, the hollow tube 51 reveals a reflective inner wall. The hollow tube 51 preferably reveals a straight optical axis. At any rate, the optical axis of the hollow tube 51 at the first end of the hollow tube 51 which is positioned at the output port 49 of the closed cavity 27 coincides with the optical axis of the closed cavity 27 or the mirrors 45, 47, respectively.

The inner diameter of the hollow tube 51 shall be chosen in such a way that it equals or exceeds, at least at its first end, the maximum dimension of the random light source 41 in any plane perpendicular to the optical axis A. Further, the inner diameter of the hollow tube 51, at least at its second end, is chosen in such a way that the whole cross-section of the hollow tube 51 is covered by the sensitive area of the photodetector 35, which is positioned at the second end of the hollow tube 51.

Of course, if desired and if an additional attenuation is acceptable, the hollow tube 51 may have an inner diameter that varies between its first and second ends. Further, the hollow tube may reveal a bent axis if a straight axis is not possible due to spatial constraints.

At this point, it shall be mentioned that the random light collector 5 may, of course, be designed identically with the random light collector 30 shown in FIG. 3.

The ellipsoid mirror 47 and the spherical mirror 45 as well as the hollow tube 51 may consist of a non-ferromagnetic material such as copper, especially an oxygen-free high thermal conductivity (OHFC) copper. The surfaces of these elements can be polished or precisely machined in order to grant a sufficiently high reflectivity.

As shown in FIG. 3, the hollow tube 51 may, with its first end, be connected to the spherical mirror in order to increase the stability of the position of the hollow tube 51 with respect to the closed cavity 27. The connection may be effected by gluing, welding or brazing, depending on the materials of the hollow tube 51 and the spherical mirror 45. This type of connection is visualized in FIG. 3 by a using a connecting material 61. It would, of course, also be possible to use a detachable connection between the hollow tube 51 and the spherical mirror 45, e.g. by screwing.

The hollow tube may reveal no vacuum sealing provided that it is completely inserted in the vacuum enclosure. In this case, the vacuum sealed windows and the photodetector should be positioned as close as possible to the output on the tube in order to limit the optical power loss.

The hollow tube may reveal a transparent sealing element 53 in the form of an end cap 55 provided at its second end, the end cap 55 being vacuum-tightly connected to the second end of the hollow tube. It is, of course, also possible to position a transparent sealing element within the hollow tube 51. The transparent sealing element may consist of glass or of a transparent plastic material.

As apparent from FIG. 3, the hollow tube 51 extends through the magnetic shield assembly 59. The hollow tube 51 may also extend the vacuum enclosure 57. Of course, the vacuum enclosure 57 must be vacuum-tightly connected to the outer surface of the hollow tube 51 in order to maintain the vacuum within the vacuum enclosure 57. Of course, the hollow tube 51 may be provided with a radially extending flange on its outer wall in order to facilitate a vacuum-tight connection with the vacuum enclosure 57. The connection can be realized as a fixed connection, e.g. by gluing, welding or brazing, or as a detachable connection, e.g. by screwing.

Likewise, the outer surface of the hollow tube 51 may be connected to the magnetic shield assembly 59, which is provided within the vacuum defined by the vacuum enclosure 57. The magnetic shied assembly 59 is preferably electrically isolated from the hollow tube to avoid any thermo-electrical current between shields. This connection may also be realized as non-detachable connection by gluing, welding or brazing, depending on the materials of the magnetic shield 59 and the hollow tube 51 (this type of connection is shown in FIG. 3, wherein a connecting material 61 is used), or as detachable connection, e.g. by screwing.

As already mentioned above, the photodetector 35 is provided at the second end of the hollow tube 51 and is preferably detachably mounted thereto. The sensitive area of the photodetector 35 covers the whole cross-section of the hollow interior space of the tube 51. As apparent from FIG. 3, the sensitive area of the photodetector 35 is provided adjacent the outer surface of the transparent sealing element 53.

Thus, the hollow tube 51 is a very simple and easy-to-realize means for directing the reflected photons and photons which are directly emitted to the output port to a photodetector. Compared to the use of a telescope comprising a plurality of components which must be adjusted with respect to each other and with respect to the optical axis of the spherical mirror 45 and the ellipsoid mirror 47, the hollow tube 51 is much simpler and cheaper to manufacture and position with respect to the spherical mirror 45.

As an exact image of the fluorescent light in the plane (perpendicular to the optical axis A) of the output port of the closed cavity 27 in the plane of the sensitive area of the photodetector 35 is not required, this optical disadvantage of a hollow tube 51 as an optical imaging means as compared to an optical telescope is of no relevance. The essential property of the means for guiding the fluorescent light to the sensitive area of the photodetector 35 is an appropriate low attenuation or a high reflectivity, respectively. It is of no relevance at which position a photon reaches the sensitive area of the photodetector 35; the only essential criterion is that as many photons as possible that reach the plane of the output port at whatever point also reach the sensitive area of the photodetector 35.

Thus, the use of a hollow tube having a reflecting inner surface as a means for guiding the fluorescent light to the sensitive area of a photodetector decisively simplifies the design of a random light collector device and even improves the collection efficiency as compared to other types of suitable guiding means.

Figure 2:
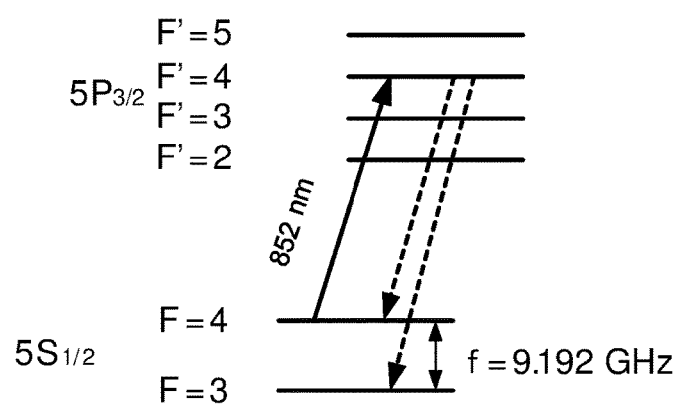
FIG. 2 is a simplified energy level diagram for cesium (only the $5P_{3/2}$ excited states are shown along with the $5S_{1/2}$ ground state for simplicity, but other transition are possible, e.g. to $5P_{1/2}$ excited state)

The embodiment shown in FIGS. 1 to 3 represents one possible solution in order to solve the technical problem underlying the invention, only, and may not be interpreted in a manner limiting the scope of protection, which extends to all other possible embodiments apparent to an expert in view of the above description.

It would, for example, also be possible to use a hollow tube 51, which does not extend through the vacuum enclosure 57 but extends up to the inner wall thereof. Of course, in such an embodiment, a transparent and vacuum type window is used in order to enable the radiation to pass from the inner volume of the hollow tube to the outside, wherein the photodetector would be placed with its sensitive area close to or immediately at the outside of the transparent window. In such an embodiment, the respective end of the hollow tube 51 might be positioned close to or be fixed to the inner wall of the vacuum enclosure 57 in any of the afore-mentioned manners.

LIST OF REFERENCE SIGNS 1 frequency standard
3 random light collector device
5 random light collector device
7 Ramsey cavity
9 cesium oven
11 pump laser
13 synchronous detector
15 synchronous detector
17 laser driver
19 RF source
21 modulating frequency source
23 modulating frequency source
25 semi-transparent mirror
27 closed cavity
29 pump light beam through cavity 27 of random light collector 3
31 beam of cesium atoms
33 random light source
35 photodetector
37 mirror
39 pump light beam through cavity 27 of random light collector 5
41 random light source
43 photodetector
45 spherical mirror
47 ellipsoid mirror
49 output port
51 hollow tube
53 sealing element
55 end cap
57 vacuum enclosure
59 magnetic shield assembly
61 connecting material
A optical axis
$S_{D1}$ detection signal
$S_{D2}$ detection signal
$S_{ex}$ electrical excitation signal
$f_{ex}$ frequency of the RF source 19
F1 $1^{st}$ focal point of the ellipsoid mirror
F2 $2^{nd}$ focal point of the ellipsoid mirror
F3 center or focal point of the spherical mirror

The invention claimed is:
1. A random light collector device comprising
(a) a reflecting cavity configured to enclose a random light source that randomly transmits photons in essentially the whole solid angle of $4\pi$ steradian, the reflecting cavity having an inner wall adapted to reflect the photons in such a way that at least a portion of once or multiply reflected photons is directed to an output port of the reflecting cavity and
(b) a guiding means for directing the reflected photons and photons which are directly emitted to the output port and to a photodetector,
(c) wherein the guiding means is a hollow tube having an inner wall adapted to reflect the photons, and
(d) wherein a first end of the hollow tube is connected to or positioned adjacent to the output port of the reflecting cavity and wherein the photodetector is provided within the hollow tube or directly at or sufficiently close to a second end thereof in such a way that a sensitive area of the photodetector covers the whole cross-section of the second end.

2. The random light collector device according to claim 1, wherein the hollow tube is tightly connected to the reflecting cavity, preferably by screwing, bonding, welding or brazing.

3. The random light collector device according to claim 1, wherein the cross-section of the hollow tube is, at least at the first end thereof, equal to or greater than the three-dimensional extension of the random light source, especially equal to or greater than the cross-section of the three-dimensional extension of the random light source in a plane orthogonal to the straight line between the center of the random light source and the center of the cross-section of the hollow tube at the first end thereof.

4. The random light collector device according to claim 1, wherein the hollow tube has a straight axis that is aligned with a straight line through the center of the random light source and the center of the cross-section of the hollow tube at the first end thereof.

5. The random light collector device according to claim 1, wherein the reflecting cavity includes an ellipsoid concave mirror having a reflecting inner surface and a first focal point and a second focal point and a spherical concave mirror having a reflecting inner surface and a third focal point, the ellipsoid concave mirror and the spherical concave mirror having a common optical axis, wherein the first focal point essentially coincides with the center of the random light source, wherein the second focal point essentially coincides with the center of the cross-section of the output port or the surface of the spherical concave mirror, respectively, and wherein the third focal point coincides with the first focal point.

6. The random light collector device according to claim 5, wherein the ellipsoid concave mirror and the spherical concave mirror are connected to or positioned adjacent to each other in a plane perpendicular to the common optical axis, and wherein the radii of the reflecting inner surfaces of the ellipsoid concave mirror and the spherical concave mirror are identical in this plane.

7. The random light collector device according to claim 1, further comprising an essentially closed magnetic shield assembly encompassing the reflecting cavity, and wherein the hollow tube extends through the magnetic shield assembly.

8. The random light collector device according to claim 1, wherein the hollow tube is made of a non-ferromagnetic material, including a non-ferromagnetic metal like copper.

9. The random light collector device according to claim 7, wherein the magnetic shield is mechanically connected to and preferably electrically isolated from the outer surface of the hollow tube.

10. The random light collector device according to claim 1, further comprising a vacuum-tight enclosure encompassing the reflecting cavity, wherein the hollow tube extends through the vacuum-tight enclosure, and wherein the vacuum-tight enclosure is vacuum-tightly connected to the outer surface of the hollow tube.

11. The random light collector device according to claim 10, wherein the cross section of the hollow tube is vacuum-tightly closed by a transparent sealing element, wherein the transparent sealing element is provided within the axial length of the hollow tube or wherein the transparent sealing element covers the second end of the hollow tube and abuts the end face thereof.

12. The random light collector device according to claim 11, wherein the photodetector is positioned adjacent to the transparent sealing element outside of a vacuum space defined by the vacuum-tight enclosure and the hollow tube comprises the transparent sealing element.

13. The random light collector device according to claim 1, further comprising a vacuum-tight enclosure encompassing the reflecting cavity and the hollow tube and having a transparent vacuum-tight window, wherein the hollow tube extends with its second end up to or close to the vacuum-tight window of the vacuum-tight enclosure.

14. The random light collector device according to claim 1, wherein the reflecting cavity and the hollow tube are made of pure metal, includes an oxygen-free high thermal conductivity copper.

15. The random light collector device according to claim 1, wherein the photodetector is a silicon photodiode.

16. The random light collector device according to claim 2, wherein the cross-section of the hollow tube is, at least at the first end thereof, equal to or greater than the three-dimensional extension of the random light source, especially equal to or greater than the cross-section of the three-dimensional extension of the random light source in a plane orthogonal to the straight line between the center of the random light source and the center of the cross-section of the hollow tube at the first end thereof.

17. The random light collector device according to claim 16, wherein the hollow tube has a straight axis that is aligned with a straight line through the center of the random light source and the center of the cross-section of the hollow tube at the first end thereof.

18. The random light collector device according to claim 2, wherein the hollow tube has a straight axis that is aligned with a straight line through the center of the random light source and the center of the cross-section of the hollow tube at the first end thereof.

19. The random light collector device according to claim 3, wherein the hollow tube has a straight axis that is aligned with a straight line through the center of the random light source and the center of the cross-section of the hollow tube at the first end thereof.

20. The random light collector device according to claim 2, wherein the reflecting cavity includes an ellipsoid concave mirror having a reflecting inner surface and a first focal point and a second focal point and a spherical concave mirror having a reflecting inner surface and a third focal point, the ellipsoid concave mirror and the spherical concave mirror having a common optical axis, wherein the first focal point essentially coincides with the center of the random light source, wherein the second focal point essentially coincides with the center of the cross-section of the output port or the surface of the spherical concave mirror, respectively, and wherein the third focal point coincides with the first focal point.

* * * * *